United States Patent [19]
Sakamoto et al.

[11] Patent Number: 5,410,845
[45] Date of Patent: May 2, 1995

[54] VIBRATION CONTROL DEVICE FOR STRUCTURE

[75] Inventors: Mitsuo Sakamoto; Norihide Koshika; Isao Nishimura; Katsuyasu Sasaki; Satoshi Orui, all of Tokyo, Japan

[73] Assignee: Kajima Corporation, Tokyo, Japan

[21] Appl. No.: 16,709

[22] Filed: Feb. 11, 1993

[30] Foreign Application Priority Data

Feb. 14, 1992 [JP] Japan .................. 4-028540

[51] Int. Cl.⁶ .............................................. F04B 1/98
[52] U.S. Cl. .................................. 52/167.2; 52/167.1
[58] Field of Search ....... 52/167 R, 167 DF, 167 RM, 52/167 E, 167 EA

[56] References Cited

U.S. PATENT DOCUMENTS

| | | |
|---|---|---|
| 4,593,501 | 6/1986 | Delfosse . |
| 4,783,937 | 11/1988 | Sato ................. 52/167 DF |
| 4,922,671 | 5/1990 | Sato ................. 52/167 DF |
| 4,924,640 | 5/1990 | Suizu et al. ............ 52/167 DF |

FOREIGN PATENT DOCUMENTS 0316076  5/1989  European Pat. Off. .

OTHER PUBLICATIONS

Japanese Abstract No. JP 3249443, Nov. 7, 1991.
Japanese Abstract No. JP 3250165, Nov. 7, 1991.
Japanese Abstract No. JP 63297837, Dec. 5, 1988.
Japanese Abstract No. JP 4001375, Jan. 6, 1992.

Primary Examiner—Michael Safavi
Attorney, Agent, or Firm—James H. Tilberry

[57] ABSTRACT

A vibration control device of an active type for a structure comprising a first additional mass body movable relative to the structure; spring means for giving a period to the additional mass body which synchronizes with the natural period of the structure; a second additional mass body supported by and movable relative to the first additional mass body; and drive means for applying a control force between the first and second additional mass bodies in response to a sensed vibrations of an earthquake or the like. Laminated rubber support provides main spring means for synchronizing with the assumed natural period of the structure. Auxiliary spring means, such as laminated rubber or coil springs, is separately provided for fine tuning the period of the device. The responses from the structure are reduced by adjusting the difference between the assumed and actual natural periods of the structure by use of the auxiliary spring means and by providing the control force from the drive means.

17 Claims, 5 Drawing Sheets

VIBRATION CONTROL DEVICE FOR STRUCTURE

BACKGROUND OF THE INVENTION

1. Field of the Invention

The field of invention is vibration control devices and the means to control these devices, which are employed to protect structures from the destructive forces of earthquake, high winds, and the like.

2. Description of Related Art

Examples of vibration control devices of the dynamic damper type (DD) in the subject field of invention are illustrated in Japanese Patent Laid-open No. 63-76932 and Japanese Patent Publication No. 3-38386.

Figure 10:
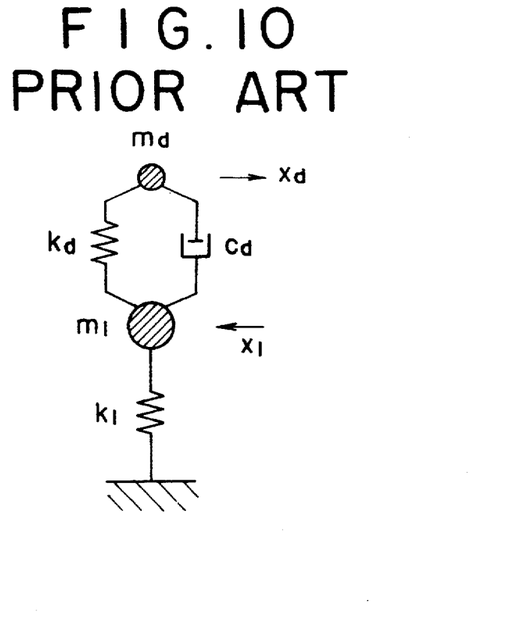
FIG. 10 is a schematic vibration model diagram showing a prior art dynamic damper.

Prior art FIG. 10 of the subject application shows a vibration model of a DD applied to a structure, wherein $m_1$ is a mass of a main body of the structure, constituting a main vibration system, and $m_d$ is a mass of an additional mass body constituting a damping system. The spring constant of the main body of the structure is identified as $k_1$. The main body of the structure and the additional mass body are connected by means of a spring having a spring constant $k_d$ and a damper having a damping coefficient $c_d$. Displacement of the mass $m_1$ is indicated by the arrow $x_1$, and counter displacement of mass $m_d$ is indicated by the arrow $x_d$.

A natural angular frequency of the main vibration system is given by:

$$\omega_1 = (k_1/m_1)^{\frac{1}{2}}$$

The mass $m_d$ of the damping system is normally designed so that the ratio of the mass $m_d$ to the mass $m_1$ of the main vibration system may be set to approximately become:

$$\mu = m_d/m_1 \geq 0.01$$

At this time, the natural angular frequency of the damping system is given by:

$$\omega_d = (1/1+\mu)\omega_1$$

A damping coefficient $c_d$ and a damping factor $h_d$ are represented by the following equations, respectively:

$c_d = 2 \, m_d \, \omega_d \, h_d$ $h_d = [3\mu/8(1+\mu)]^{\frac{1}{2}}$

There are also active mass drivers (AMD) which function as vibration control devices, e.g., U.S. Pat. No. 5,022,201 (Japanese Patent Laid-open Nos. 1-275866, 1-275867, 1-275868, and 1-275869.

Figure 11:
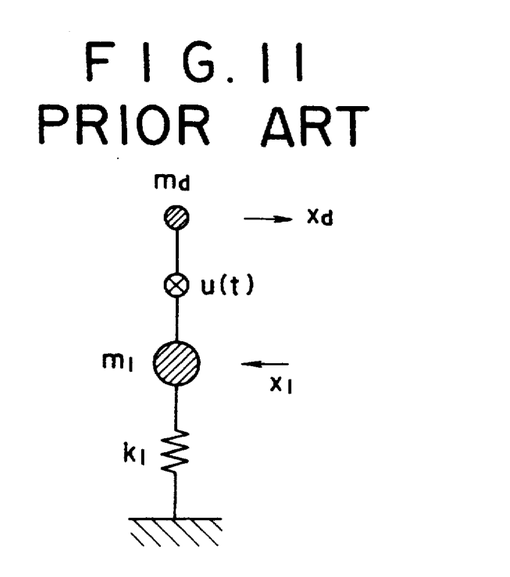
FIG. 11 is a schematic vibration model diagram showing a prior art active mass damper.

Prior art FIG. 11 shows a vibration model of an AMD which applies a control force u(t) by means of hydraulic power or electromagnetic force of an actuator positioned between the main body of the structure having a mass m and the additional mass body having a mass $m_d$, to actively control the vibration of the structure.

In the prior art control device of FIG. 11, assuming that a spring between the main body of the structure and the additional mass body constituting a vibration control device is set pursuant to the equation $$\omega_d \leq (1/2)\omega_1,$$

the control force u(t) is given by the following equation:

$$u(t) = G_1(dx_1/dx) + G_2(dx_d/dt)$$

wherein $G_1$ is a gain in a circuit including an automatic gain control circuit (AGC) or the like against the response speed of the structure and attains the correspondences of large inputs through small inputs, wherein $G_2$ becomes a negative value. The second term in the above equation gives a damping property to the additional mass body and attains a stability thereof by adding the product of a gain $G_2$ and vibration speed to the control force of the additional mass body.

Figure 12:
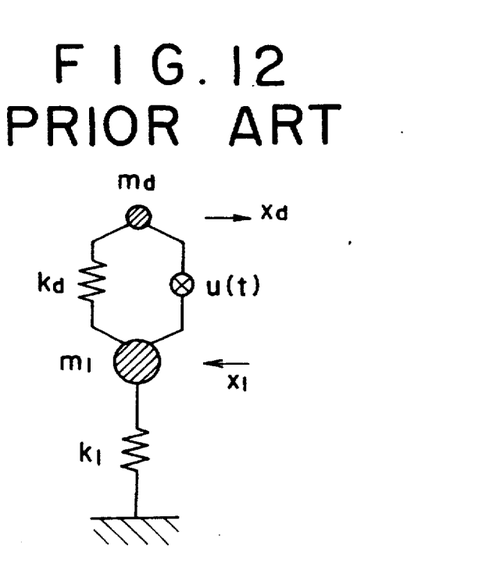
FIG. 12 is a schematic vibration model diagram showing a prior art active tuned mass damper.

As shown in prior art FIG. 12, a spring having a spring constant $k_d$ is added to the AMD described above, in parallel with the control force u(t) to obtain a vibration control effect by means of less control force in comparison with that of an active tuned mass damper (designated as ATMD hereafter.)

In an ATMD, a spring constant $k_d$ is set so that the vibration of an additional mass body may synchronize with that of a structure, that is, $$\omega_d = \omega_1$$

and the control force u(t) is, for example, given by the following equation, $$u(t) = G_1(dx_1/dt) + G_2(dx_d/dt) + G_3(x_1 - x_d)$$

wherein $G_3$ is a gain having a negative sign and cancels a part of the inertial force applied to the additional mass body at a vibration time due to the third term in the above equation, so that the additional mass body may be vibrated by less control force.

Japanese Patent Publication No. 3-70075 discloses a vibration control device of an active type for controlling structural vibration due to an earthquake or the like. A second additional mass body having a mass less than the first additional mass body of the DD is connected to the first additional mass body of the DD through a spring and an actuator, wherein a control force is applied to the second additional mass body by the actuator.

In the above-mentioned vibration control device, the DD has an advantage in that no energy supply to the device is necessary. The vibration control effect is determined by the mass ratio of the first additional mass body to the mass of the structure. Therefore, it is necessary to have a large first additional mass body with which it is difficult to obtain a sufficient vibration control.

In the case of the AMD, more control can be expected by the use of an additional mass body having a small mass in comparison with that in the case of the DD. However, an energy supply is necessary, and it is necessary to arrange additional facilities and equipment for the energy supply. These additional facilities include a specially designed control circuit for applying a predetermined control force in accordance with the vibration responses of the structure and the additional mass body; means to secure stability of the device; and means to prevent malfunction of the device.

As described above, the ATMD has an advantage in that the control force can be lessened in comparison with that in the case of the AMD, but it takes time to synchronize the vibration of the additional mass body with the vibration of the structure $$(\omega_d = \omega_1)$$

Furthermore, in the ATMD a portion of the inertial force can be canceled by providing a term corresponding to the spring force in order to obtain a large control effect by less control force. However, there is a problem in that a synchronizing period is newly generated for a period longer than the natural period of the structure in the periodic components of the earthquake, wherein the amplitude of the additional mass body increases so that control becomes difficult.

SUMMARY OF THE INVENTION

A vibration control device of the present invention comprises the novel addition of second additional mass bodies to a first additional mass body, and includes a first additional mass body having a predetermined mass which is movable relative to a structure. Spring means are positioned between the structure and the first additional mass body so as to provide a period to the first additional mass body which synchronizes with the natural period of the structure. A second additional mass body having a predetermined mass is movable relative to the first additional mass body, and drive means are provided for applying a control force between the first and second additional mass bodies.

A laminated rubber main spring is mounted on the structure having an upper end connected to the first additional mass body so as to provide horizontal movement to the first additional mass body. An auxiliary spring means for fine tuning period adjustment is positioned between the structure and the first additional mass body to supplement the functioning of the laminated rubber main spring.

The vibration period of the first additional mass body is adjusted by the laminated rubber main spring to the assumed natural period of the structure, wherein the difference from the actual natural period of the structure can be adjusted by the auxiliary spring means. A long period for the laminated rubber main spring can be obtained by using a plurality of ring-shaped hollow rubber laminations, or stages. A long stable period can be obtained by stacking two or more stages of the rubber laminations vertically and concentrically.

In a preferred embodiment of the invention, the auxiliary spring means is constructed of rubber laminations, the same as the main spring, but with smaller diameter laminations. In the alternative, a helical coil spring may be used as the auxiliary spring means. Adjusting the periods of the main and auxiliary springs adjusts the period of the first additional mass. In the case of the rubber laminated springs, this can be done by increasing or decreasing the number of rubber laminations in each stage.

The first additional mass body is supported on guide rails or the like installed on the structure, so as to prevent buckling of the springs from the weight of the first additional mass body. By supporting the first additional mass body a linear spring characteristic can be maintained up to a large stroke of the springs in a horizontal direction.

It is possible to obtain increased vibration control with less control force by synchronizing the vibration period of the first additional mass body with that of the second additional mass body. Synchronization can be obtained by connecting the two bodies with spring means, such as a helical coil spring, in a horizontal direction.

A preferred means for driving the second additional mass body comprises a rack mounted on the first additional mass body and a motor driven pinion mounted on the second additional mass body which drivingly engages the rack. The drive means is controlled by the response from a structure to the external forces of seismic and wind vibration on the basis of state-of-the-art vibration response analysis means. Since the inventive vibration control device is a double dynamic vibration reducer type, it provides active control for more frequent earthquakes ranging up to five on the Richter scale as well as strong winds. The inventive vibration control device can also function as a passive type for earthquakes registering higher on the Richter scale. In case the response from the structure detected by a vibration sensor exceeds a predetermined amount or the amplitude of the second additional mass body in the vibration control device exceeds a predetermined amount, the vibration control device can be modified to function as a dynamic vibration reducer of a passive type by rigidly fixing the second additional mass body to the first additional mass body, so that both bodies vibrate as a single mass.

OBJECTS OF THE INVENTION

It is among the objects of the invention to provide an improved vibration control device of a double dynamic vibration reducer type which can be operated with a small supply of energy and little control force to effectively control the vibration of a structure against earthquake vibrations, high winds, and the like, while the vibration period of an additional mass body can easily be synchronized with the natural period of the structure.

It is another object of the invention to provide great vibration control effect by the drive of an extremely small mass body.

It is yet another object of the invention to provide a second additional mass body that is extremely small in comparison with the weight of the structure, so that there is little effect on the main body of the structure, even though the capacity of the driving means for the small mass body may exceed its safe functioning limits.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
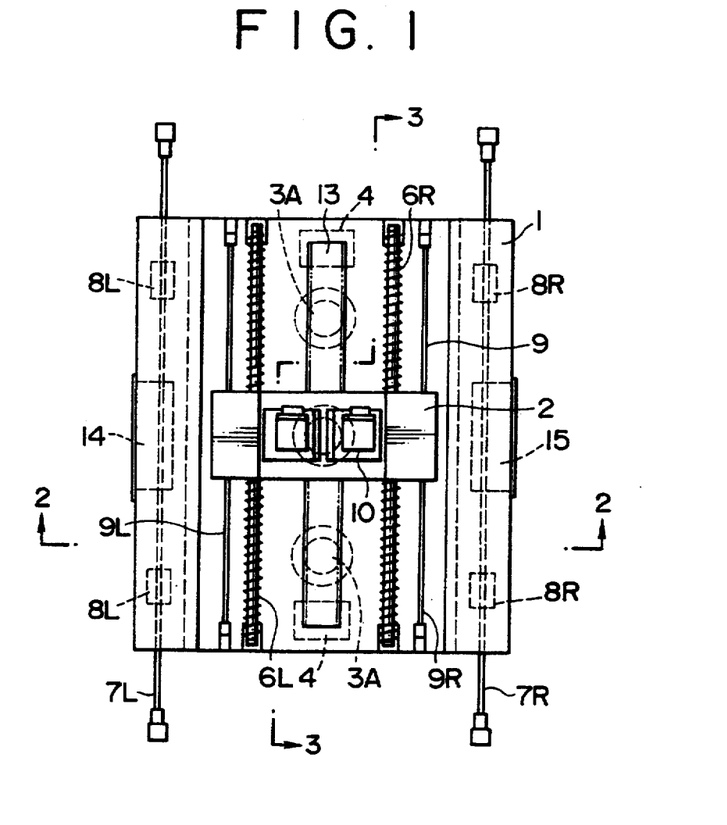
FIG. 1 is a plan view of a preferred embodiment of the invention.
Figure 2:
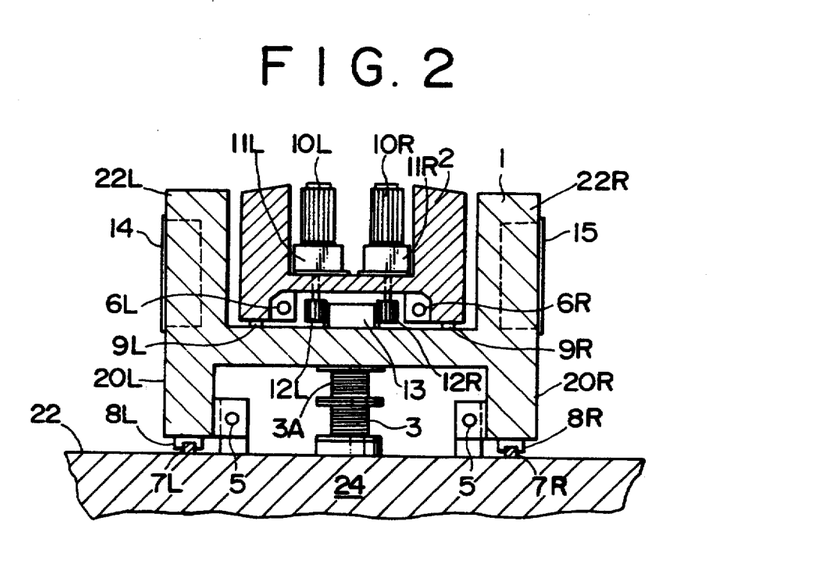
FIG. 2 is an elevational view in section taken along line 2—2 of FIG. 1.
Figure 3:
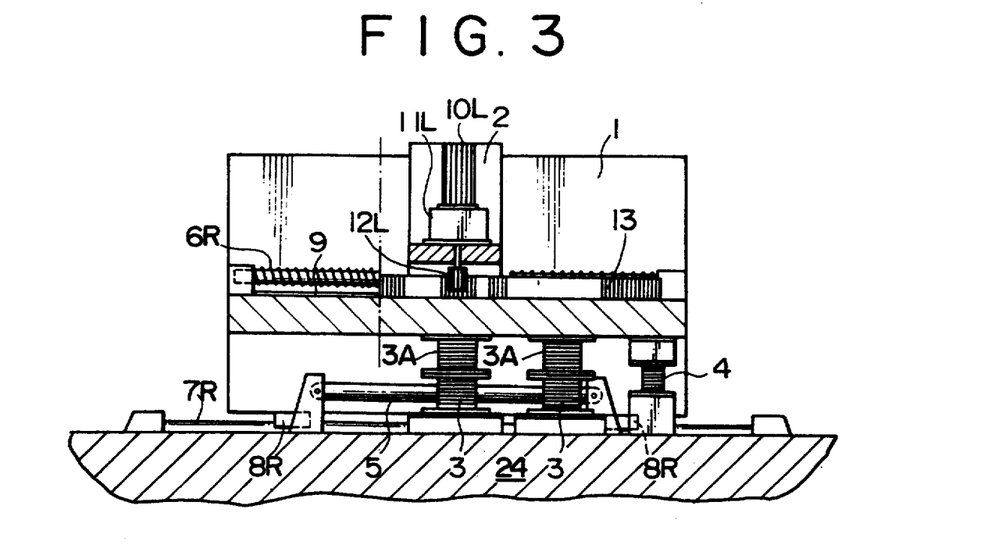
FIG. 3 is an elevational view in section taken along line 3—3 of FIG. 1.
Figure 4:
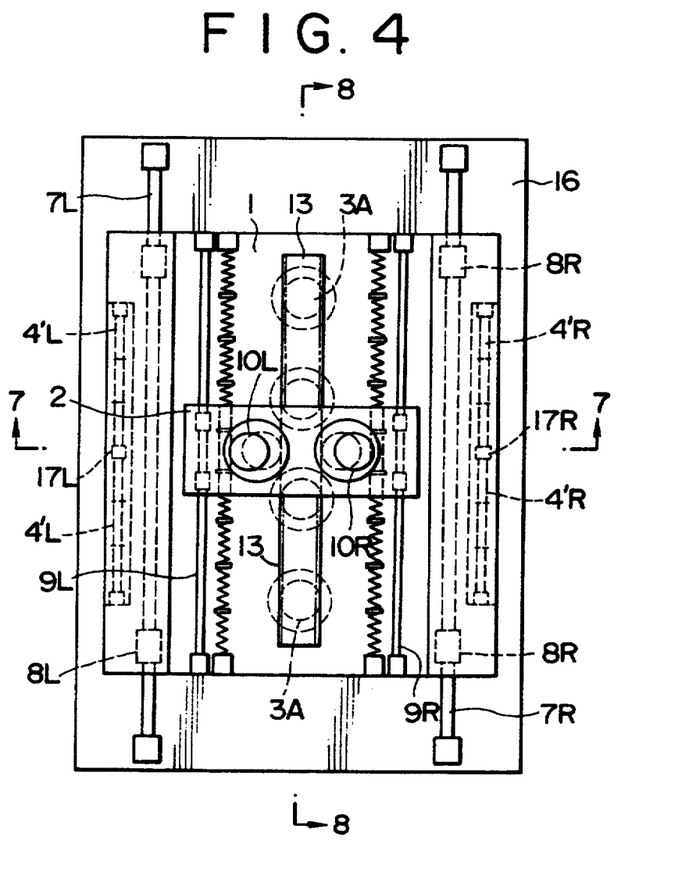
FIG. 4 is a plan view of another preferred embodiment of the invention.

Referring to the embodiment of the invention shown in FIGS. 1 through 3, an H-shaped first additional mass body 1 is shown to have pairs of U-shaped rail guides 8L and 8R secured to the undersides of legs 20L and 20R of first additional mass body 1. Rail guides 8L and 8R are slidable on low frictional rails 7L and 7R which are secured to the top side 22 of the structure 24. The weight of the first additional mass body 1 is supported by rails 7L and 7R.

Secured between the first additional mass body 1 and the structure 24 is a triad of springs 3 longitudinally aligned in the direction of horizontal vibration. The front and back portions of the first additional mass body 1, in the direction of vibration, are connected to auxiliary laminated rubber springs 4, which are used for period adjustment. The spring constant of the laminated rubber springs 3 is adjusted to the approximate assumed natural period of the structure 24, and the first additional mass body 1 is fine tuned by the auxiliary laminated rubber springs 4 to the natural period of the structure.

In the present preferred embodiment as shown in FIGS. 2 and 3, laminated rubber spring first stage 3 is secured in tandem to a concentrically aligned laminated rubber spring second stage 3A to provided a long stroke without buckling, since the weight of the first additional body is supported by the guide rails 7. Each auxiliary laminated hollow rubber spring 4 is similar to but smaller than the laminated rubber springs 3 and 3A. The adjustment of the period can be made by replacing the auxiliary laminated rubber springs 4. A pair of oil dampers 5, aligned in the direction of vibration, are provided on opposite sides of the laminated rubber springs 3 to give the system a predetermined damping coefficient. See FIG. 2.

As best shown in FIG. 2, an H-shaped second additional mass body 2 perpendicular to the longitudinal axis of vibration is provided between arms 22L and 22R of the first additional mass body 1. The second additional mass body 2 is slidable on a pair of low frictional guide rails 9L and 9R secured to the first additional mass body 1.

As shown in FIGS. 1, 2, and 3, horizontal coil springs 6L and 6R are positioned parallel to the guide rails 9L and 9R to give a predetermined spring constant to the second additional mass body 2. For the purpose of keeping the second additional mass body 2 in a neutral position, this spring constant usually provides a long period in comparison with the natural period of the structure. However, the spring constant is synchronized with the period of the first additional mass body 1 and the natural period of the structure if used in conjunction with an ATMD-like control.

With reference to the drive of the second additional mass body 2, AC servo motors 10L and 10R are installed on the second additional mass body 2 to rotate pinion gears 12L and 12R through reduction gear boxes 11L and 11R. The second additional mass body 2, therefore, is oscillated by engagement of the pinions 12L and 12R with rack 13 mounted on the first additional mass body 1 between pinions 12L and 12R. In the present preferred embodiment, the efficient utilization of the space and the simplicity of the maintenance have been attained by accommodating a controller 14 and a power panel 15 within the first additional mass body 1.

Figure 5:
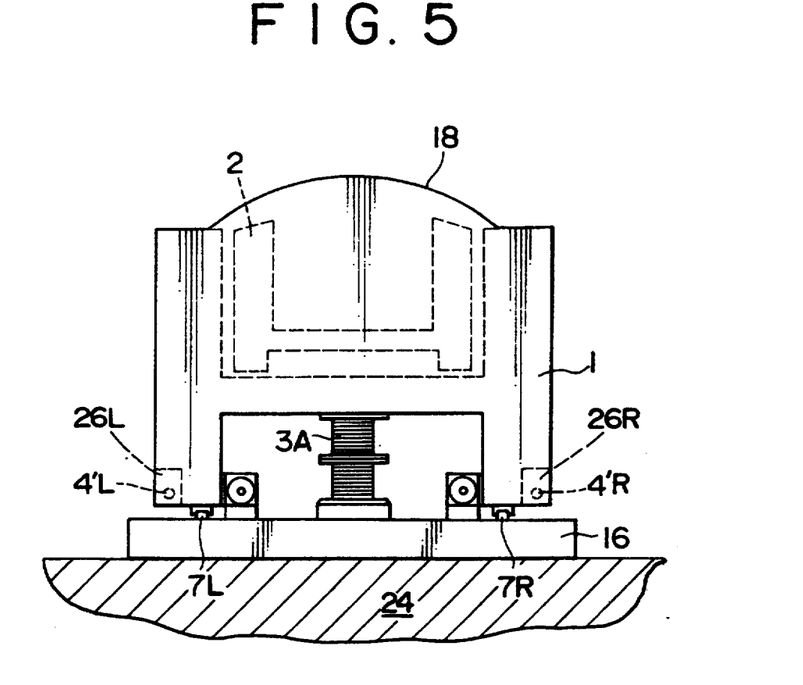
FIG. 5 is a front elevational view of the embodiment of the invention shown in FIG. 4.
Figure 6:
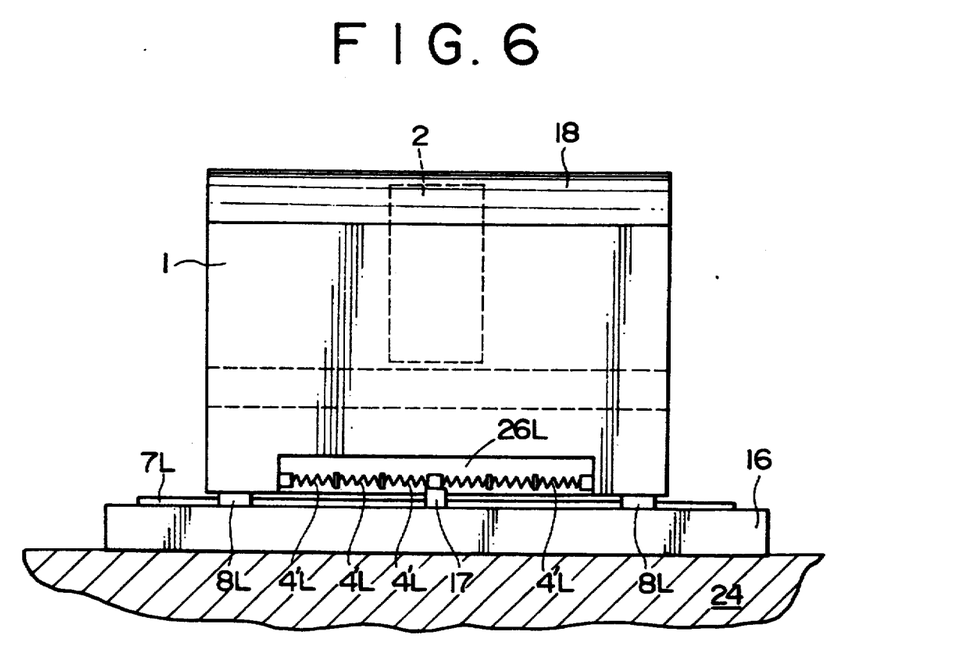
FIG. 6 is a side elevational view of FIG. 4.
Figure 7:
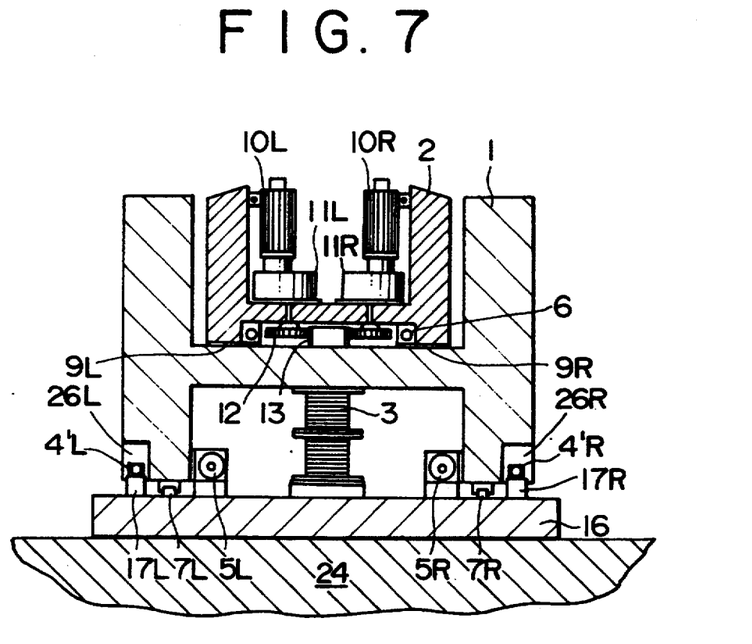
FIG. 7 is an elevational view in section taken along line 7—7 of FIG. 4.
Figure 8:
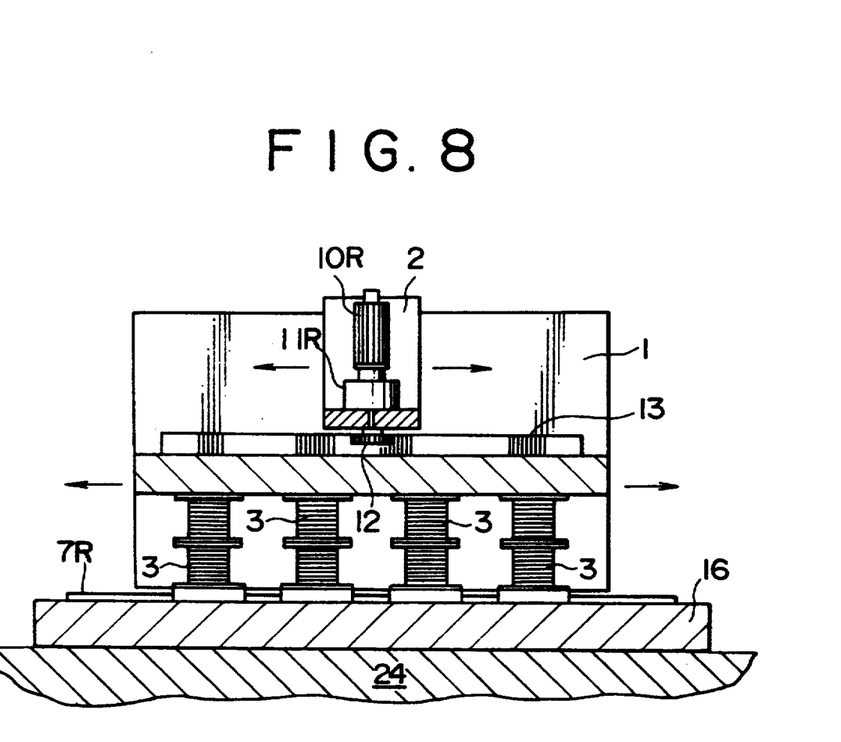
FIG. 8 is an elevational view in section taken along line 8—8 of FIG. 4.

FIGS. 4 through 8 show another preferred embodiment of a vibration control device in accordance with the present invention. Although the basic components are substantially similar to the preferred embodiment shown in FIGS. 1 through 3, wherein like numbers identify like parts, coil springs 4' are used as auxiliary spring means for use of period adjustment relative to the first additional mass body 1, instead of the auxiliary hollow laminated rubber springs 4. As illustrated in FIGS. 6 and 7, there are a plurality of coil springs 4'L and 4'R aligned in series within the concave portions 26L and 26R on both side surfaces of the first additional mass body 1, respectively, and the longitudinal center of each coil spring is connected to a support section 17, which, in turn, is secured to a pedestal 16 fixed to the structure 24.

By use of the coil springs 4', the stroke of the first additional mass body 1 can be adjusted within a relatively large range in comparison with that of the auxiliary hollow laminated rubber springs 4 of the preferred embodiment of the invention shown in FIGS. 1, 2, and 3, wherein the stroke depends on the horizontal deformability of the laminated rubber. Since the coil springs 4' are installed adjacent to the outside surfaces of the first additional mass body 1, attaching and detaching of the coil springs are easily facilitated. As shown in FIGS. 5 and 6, the upper portion of the device is enclosed with a cover 18 which is detachable whenever maintenance is necessary.

Figure 9:
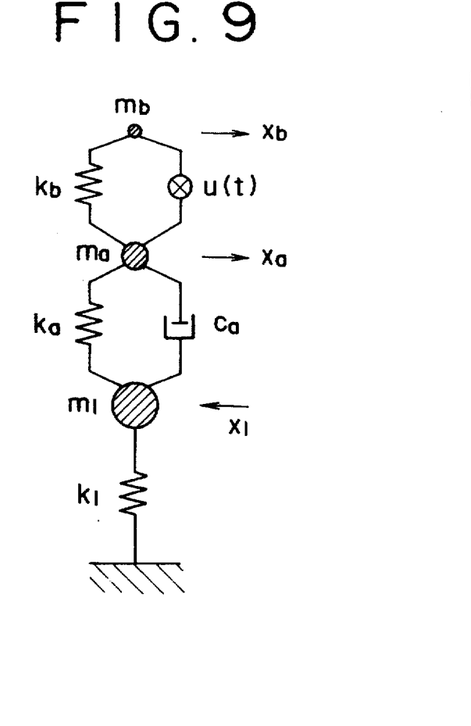
FIG. 9 a schematic vibration model diagram showing a preferred embodiment of the inventive vibration control device.

FIG. 9 schematically illustrates a vibration control device model of the present invention. In the drawing, $m_1$ represents a mass of a structure constituting a main vibration system, $m_a$ represents a mass of first additional mass body, $m_b$ represents a mass of a second additional mass body, $k_1$ indicates a spring constant to the main body means to the first additional mass body, $c_a$ indicates of the structure, $k_a$ indicates a spring constant of spring a damping coefficient to the first additional mass body, $k_b$ indicates a spring constant to the second additional mass body, and $u(t)$ indicates a control force. Displacement of the structure is indicated at $x_f$, displacement of the first additional mass body is indicated at $x_a$; and $x_b$ indicates a displacement of the second additional mass body.

The mass of the first additional mass body, $m_1$ of FIG. 9 is assumed to be approximately 1/100 to 1/2000 of the mass of the structure. The mass of the second additional mass body is assumed to be approximately 1/20 to 1/100 of the mass of the first additional mass body.

By use of the parameters shown in FIG. 9, the angular frequencies $$\omega_1, \omega_a \text{ and } \omega_b$$

of a main vibration system and the first and second additional mass bodies are represented by the following equations:

$$\omega_1 = (k_1/m_1)^{\frac{1}{2}}$$
$$\omega_a = (k_a m_a)^{\frac{1}{2}}$$
$$\omega_b = (k_b/m_b)^{\frac{1}{2}}$$

By synchronizing the angular frequencies witch one another, the relation of the following equation can be established:

$$\omega_1 \approx \omega_a \approx \omega_b$$

There are, however, some cases of applying a conventional AMD-like control by setting $\omega_b$ as a sufficiently small value in comparison with those of $\omega_1$ and $\omega_a$ without synchronizing with one another.

Furthermore, the relationship among the preceding structure and the masses of the first and second additional mass bodies can be represented by:

$$m_a/m_1 = 1/100 \text{ to } 1/2000$$
$$m_b/m_a = 1/10 \text{ to } 1/20$$

A control force for controlling the movement of a driver serving as the second additional mass body is defined by the following equation, e.g., $$u(t) = G_1(dx_1/dt) + G_2(x_a - x_1) + G_3(dx_b/dt) + G_4(x_b - x_a) \quad (1)$$

wherein each of $G_1$, $G_2$, $G_3$, and $G_4$ is a gain in each term of the above equation (1), respectively.

Energy is mainly consumed by a damper function (damping coefficient $c_a$) to the first additional mass body.

Since the angular frequency $\omega_a$ of the first additional mass body is synchronized with the angular frequency $\omega_1$ of the main vibration system, it forms a dynamic damper (dynamic vibration reducer). It is, however, desirable to slightly increase the damping coefficient $c_a$ to the first additional mass body in comparison with the optimum design value of the dynamic damper.

Then, the control force u(t) is applied so that the first additional mass body (mass $m_a$) is vibrated. In case of the above equation (1), the speed $(dx_1/dt)$ of the structure is fed back and the first additional mass body (mass $m_a$) can amplify the motion of a normal DD (dynamic damper), resulting in the increase of vibration control effect.

The reaction force from the control force u(t) is treated by use of the inertial force from the second additional mass body (mass $m_b = 1/10\ m_a$ to $1/20\ m_a$).

The third term in the above equation (1) is available for providing a damping property to the second additional mass body as well by use of the relationship of action and reaction, and the vibration stabilization for the second additional mass body can be attained thereby.

Furthermore, the spring force (spring constant $k_b$) absorbs the greater part of the force needed to control when the angular frequency $\omega_b$ of the second additional mass body is also synchronized with the angular frequency $\omega_1$ of the main vibration system by use of the principle of the ATMD described above, and therefore, the necessary force for the control becomes even less.

A control force [u(t)], an inertial force $[m_b(dx_b/dt)^2]$, and a spring force $[k_b(x_b - x_a)]$ act on the second additional mass body and the following relation is given by:

(Control Force) + (Inertial Force) + (Spring Force) = 0 Therefore, the inertial and the spring forces cancel with each other, so that the control force can be less.

The control described above is applied to highly frequent earthquakes and winds. The vibration control device may desirably have means for stopping the drive of the second additional mass body in order to prevent any damage of the device from a large earthquake beyond the capacity of the device. Even in this case, the device can function as a dynamic vibration reducer of a passive type.

It will occur to those skilled in the art, upon reading the foregoing description of the preferred embodiments of the invention, taken in conjunction with a study of the drawings, that certain modifications may be made to the invention without departing from the intent or scope of the invention. It is intended, therefore, that the invention be construed and limited only by the appended claims.

We claim:

1. In combination, a structure and horizontal vibration control device for said structure comprising:

a solid first additional mass body having a predetermined mass secured to and movable horizontally relative to the said structure;

spring means intervened between said structure and said first additional mass body to provide a period for said first additional mass body which synchronizes with the natural period of said structure;

a solid second additional mass body supported on said first additional mass body having a predetermined mass and movable horizontally relative to said first additional mass body; and drive means mounted on and secured to said solid second additional mass body and drivingly connected to said first additional mass body for applying a control force between said first and second solid additional mass bodies;

wherein said spring means includes a laminated rubber member sandwiched between and secured to said structure and said first additional mass body, and auxiliary spring means intervened between said structure and said first additional mass body for period adjustment of said first additional mass body.

2. The combination structure and horizontal vibration control device according to claim 1, wherein said auxiliary spring means is a laminated rubber device sandwiched between and secured to said structure and said first additional mass body to provide said period adjustment.

3. The combination structure and horizontal vibration control device according to claim 2, wherein said laminated rubber device is a vertically columnar hollow laminated rubber member.

4. The combination structure and horizontal vibration control device according to claim 1, wherein said auxiliary spring means is a horizontal coil spring used for said period adjustment by interconnecting said horizontal coil spring between said structure and said first additional mass body to permit said first additional mass to vibrate in a horizontal direction.

5. The combination structure and horizontal vibration control device according to claim 1, including first guide rail means secured to said structure which support the weight of said first additional mass body and for guiding said first additional mass body to slide horizontally thereon.

6. The combination structure and horizontal vibration control device according to claim 5, wherein said structure and said first additional mass body are interconnected by an oil damper provided to damp said first additional mass body in a horizontal direction.

7. The combination structure and vibration control device according to claim 1, wherein said first and second additional mass bodies are interconnected by a horizontal coil spring for synchronizing the vibration period of said second additional mass body with the vibration period of said first additional mass body.

8. The combination structure and vibration control device according to claim 5, wherein said first additional mass body has secured thereto second guide rail means which support the weight of said second additional mass body and guide said second additional mass body to slide horizontally thereon.

9. The combination structure and vibration control device according to claim 7, wherein said first additional mass body has secured thereto a second guide rail means which support the weight of said second additional mass body and guide said second additional mass body to slide horizontally thereon.

10. A vibration control device for a structure according to claim 1, wherein said drive means has a rack provided on said first additional mass body, a pinion provided on said second additional mass body and engaged with said rack, and a motor for rotating said pinion.

11. The combination structure and horizontal vibration control device according to claim 1, wherein said first and second additional mass bodies are H-configured, each comprising a pair of spaced apart upstanding side members and a horizontal cross member interconnecting said upstanding side members, said upstanding side members of said first additional mass body being horizontally slidable on said structure, said second additional mass body being positioned between said upstanding side members of said first additional mass body to slidably rest on said horizontal cross member of said first additional mass body; said drive means for applying said control force between said first and second additional mass bodies including rack means secured to said first additional mass body horizontal cross member; rotatable pinion means secured to said second additional mass body horizontal cross member and drivably engaged with said rack means; and motor means to drive said pinion means, whereby said second additional mass body is horizontally movable relative to said first additional mass body.

12. In combination, a structure and a horizontal vibration control device comprising:
  a solid first additional mass body having a predetermined mass secured to, supported by, and movable horizontally on the said structure;
  spring means intervened between and connected to said structure and said first additional mass body to provide a period for said first additional mass body which synchronizes with the natural period of said structure;
  a solid second additional mass body secured to and supported on said first additional mass body, having a predetermined mass and movable horizontally relative to said first additional mass body; and
  drive means mounted on and secured to said solid second additional mass body and drivingly connected to said first additional mass body for applying a control force between said first and second solid additional mass bodies;
  wherein said spring means includes a laminated rubber member sandwiched between and secured to said structure and said first additional mass body, and auxiliary spring means intervened between and secured to said structure and said first additional mass body for period adjustment of said first additional mass body;
  said auxiliary spring means comprising a horizontal coil spring used for said period adjustment interconnected between said structure and said first additional mass body to permit said first additional mass to vibrate in a horizontal direction.

13. The combination of a structure and a horizontal vibration control device according to claim 12, wherein said first additional mass body is provided with guide rail means which support the weight of said second additional mass body and allow said second additional mass body to slide horizontally thereon.

14. The combination of a structure and a horizontal vibration control device according to claim 12, wherein said first and second additional mass bodies are interconnected by a horizontal coil spring for synchronizing the vibration period of said second additional mass body with the vibration period of said first additional mass body; and wherein said first additional mass body has secured thereto guide rail means which support the weight of said second additional mass body and allow said second additional mass body to slide horizontally thereon.

15. The combination of a structure and a horizontal vibration control device according to claim 12 wherein said drive means includes a rack secured on said first additional mass body, a pinion secured on said second additional mass body and engaging said rack, and a motor for rotating said pinion.

16. In combination, a structure and a horizontal vibration control device comprising:
  a solid first additional mass body having a predetermined mass and movable horizontally relative to the said structure;
  spring means intervened between said structure and said first additional mass body to provide a period for said first additional mass body which synchronizes with the natural period of said structure;
  a solid second additional mass body having a predetermined mass and movable horizontally relative to said first additional mass body; and
  drive means mounted on and secured to said solid second additional mass body and drivingly connected to said first additional mass body for applying a control force between said first and second additional mass bodies;
  wherein said spring means includes a laminated rubber member sandwiched between and secured to said structure and said first additional mass body, and auxiliary spring means intervened between said structure and said first additional mass body for period adjustment of said first additional mass body, including guide rail means secured to said structure for supporting the weight of said first additional mass body and for allowing said first additional mass body to slide horizontally thereon.

17. The combination of a structure and a horizontal vibration control device according to claim 16, wherein said structure and said first additional mass body are interconnected by an oil damper which damp said first additional mass body in a horizontal direction.

* * * * *